United States Patent [19]

Sayano

[11] Patent Number: 4,654,232

[45] Date of Patent: Mar. 31, 1987

[54] METHOD FOR THE FORMATION OF A TITANIUM OR ZIRCONIUM COMPOUND COATING

[75] Inventor: Akio Sayano, Yokohama, Japan

[73] Assignee: Kabushiki Kaisha Toshiba, Kawasaki, Japan

[21] Appl. No.: 871,131

[22] Filed: Jun. 2, 1986

Related U.S. Application Data

[63] Continuation of Ser. No. 716,214, Mar. 26, 1985, abandoned.

[30] Foreign Application Priority Data

Mar. 27, 1984 [JP] Japan ................................. 59-58594

[51] Int. Cl.[4] ............................................... B05D 3/02
[52] U.S. Cl. ................................. 427/376.6; 427/377; 427/399
[58] Field of Search ............... 427/376.1, 376.2, 376.3, 427/255, 255.4, 126.1, 126.2, 126.3, 399, 427, 376.6, 377

[56] References Cited

U.S. PATENT DOCUMENTS

| | | | |
|---|---|---|---|
| 2,715,593 | 8/1955 | Clark | 427/376.2 |
| 3,394,026 | 7/1968 | Parr et al. | 427/376.2 |
| 3,510,343 | 5/1970 | Twells | 427/376.2 |
| 4,159,357 | 6/1979 | Grunke | 427/376.2 |
| 4,346,147 | 8/1982 | Barlier et al. | 427/376.2 |
| 4,462,816 | 7/1984 | Wolfe et al. | 427/376.2 |
| 4,462,817 | 7/1984 | Wolfe et al. | 427/376.2 |
| 4,462,818 | 7/1984 | Wolfe et al. | 427/376.2 |

FOREIGN PATENT DOCUMENTS 57-106586  7/1982  Japan .............................. 427/376.2

*Primary Examiner*—Sadie L. Childs
*Attorney, Agent, or Firm*—Finnegan, Henderson, Farabow, Garrett & Dunner

[57] ABSTRACT

A method for forming on the surface of a sintered article of silicon nitride type ceramic a coating film of a compound containing titanium or zirconium is disclosed. This metal compound coating is easily and inexpensively obtained by placing a metal-containing substance such as, for example, titanium dioxide in contact with a sintered article of silicon nitride type ceramic and sintering the resultant composite in a non-oxidative atmosphere.

4 Claims, No Drawings

METHOD FOR THE FORMATION OF A TITANIUM OR ZIRCONIUM COMPOUND COATING

This application is a continuation of application Ser. No. 716,214, filed Mar. 26, 1985, now abandoned.

BACKGROUND OF THE INVENTION

This invention relates to a method for the formation on the surface of a sintered silicon nitride type ceramic article a coating of a compound containing titanium or zirconium.

Compounds containing titanium or zirconium such as, for example, titanium nitride and titanium carbide excel in heat resistance and resistance to wear. Thus, coatings of such compounds applied mainly to metallic members are used as cutting tools and other similar tools.

In recent years, attempts have been made at conferring improved properties upon existing sintered silicon nitride ceramic articles useful as heat-resisting structural materials and wear-resistant materials by applying coatings of such compounds thereon or, by utilizing the fact that such coatings are formable in electroconductive composition, at developing a method of joining sintered ceramic articles with metallic members and consequently widening the range of applications found for sintered ceramic articles.

Physical vapor deposition (PVD), chemical vapor deposition (CVD), flame spraying, etc. are possible methods for forming coatings of metal compounds on inorganic substrates such as sintered ceramic articles. All these methods, however, invariably require materials under treatment to be placed in special chambers and subjected to a coating operation with the degree of vacuum inside the chambers controlled very rigidly. Thus, they have the disadvantage that they find mass treatment hardly feasible, impose limits on dimensions of materials to be treated, and suffer from high cost of operation.

SUMMARY OF THE INVENTION

This invention has issued from the efforts directed to eliminating the disadvantage suffered by the prior art. It aims to provide a method of forming a coating of metal compound, which permits mass treatment, avoids imposing any limit on dimensions of materials under treatment, and ensures low cost of operation.

To be specific, the method of this invention for the formation of a coating of metal compound is characterized by the steps of placing titanium or zirconium or a substance containing such metal in contact with a sintered silicon nitride ceramic article and sintering the resultant composite in a non-oxidative atmosphere.

DETAILED DESCRIPTION OF THE INVENTION

The metal or metal compound to be placed in contact with the sintered silicon nitride type ceramic article in accordance with the present invention is titanium or zirconium or a substance containing such metal. The term "substance containing titanium or zirconium" as used herein means to embrace oxides, carbides, and borates of such metals and organic compounds containing such metals. The organic metal compounds are represented by isopropyl orthotitanate, Atron NTi (a trademark designation produced by Nihon Soda Mfg co., Ltd.), etc.

For the purpose of the present invention, in the metals and the substances containing such metals, substances containing titanium prove particularly desirable. Titanium oxide is the best choice.

When necessary, the metal or metal compound described above may be mixed with an organic binder and a solvent before it is placed in contact with the sintered ceramic article. Spreading and spraying, for example, are methods appropriate for effecting the contact mentioned above.

In accordance with this invention, the composite obtained by the aforementioned contact is heated at a temperature high enough to attain through vaporization of the organic binder or the solvent and subsequently sintered in a non oxidative atmosphere at a temperature in the range of 1200° to 1400° C. As the result, a coating of titanium nitride or zirconium nitride is formed on the surface of the sintered ceramic article presumably because titanium or zirconium reacts with the nitrogen atom in the sintered silicon nitride ceramic article.

Where the titanium or zirconium for contact with the sintered ceramic article is used in the form of its elementary metal, the non-oxidative atmosphere in which the composite is to be sintered is desired to consist of argon gas or to be in a perfect vacuum so as to avoid otherwise possible reaction between the metal and the ambient gas. Where the titanium or zirconium mentioned above is used in the form of a compound containing the metal, the atmosphere is desired to be in a reducing atmosphere because there are times when the compound is required to undergo reduction prior to the union of the compound with the sintered ceramic article.

The reducing atmosphere is desired to be formed of a mixed gas consisting of nitrogen or argon and hydrogen. The ratio of nitrogen or argon to hydrogen in the mixture is desired to fall in the range of 1:1 to 3:1.

The thickness of the coating of the metal compound is affected by the method of contact of the metal to the sintered ceramic article, the chemical relation between the sintered ceramic article and the metal, and the sintering conditions. Thus, all these conditions are to be selected so as to obtain the coating in a desired thickness.

Generally, the thickness of the coating of the metal compound after the sintering of the composite is in the range of 0.1 to about 5 $\mu$m, preferably about 1 $\mu$m.

The sintered silicon nitride ceramic article on which the coating of metal compound has been formed as described above is utilized in heat-ray reflecting films for electric furnaces, heating unit for light-selective thermal printers, and cutting tools on account of its high resistance to heat and to wear, in composite materials formed by combination with metallic members on account of its electroconductivity, and in ornamental articles on account of its metallic gloss rich in luxurious taste.

Now, the present invention will be described more specifically below with reference to working examples. It should be noted, however, that this invention is not limited in any sense by these working examples.

EXAMPLE 1:

On the surface of a sintered silicon nitride ceramic article, an aqueous 75% titanium oxide solution was applied. The applied layer of the aqueous solution was spontaneously dried to remove water. The sintered ceramic article so coated was sintered in a mixed gas of nitrogen and hydrogen at 1350° C. for one hour. Consequently, the surface coated with titanium oxide formed a uniform coating of titanium nitride shining in a golden gloss. This glossy surface exhibited electric resistance of about $2 \times 10^{-5} \Omega \cdot cm$.

EXAMPLE 2:

On the surface of a sintered silicon nitride ceramic article, isopropyl ortho-titanate ($Ti[OCH(CH_3)_2]_4$) was applied and dried. The sintered ceramic article so coated was fired in a mixed gas of argon and hydrogen at 1350° C. for one hour. Consequently, the surface so coated formed a uniform coating of titanium nitride shining in a golden gloss.

EXAMPLE 3:

On the surface of a sintered silicon nitride ceramic article, a solution of an organic metal containing titanium (a product of Nihon Soda Mfg Co., Ltd. and marketed under trademark designation of "Atron NTi") was applied and dried. The sintered ceramic article so coated was sintered in a mixed gas of nitrogen and hydrogen at 1350° C. for one hour. Consequently, the surface so coated formed a uniform coating of titanium nitride shining in a golden gloss.

What is claimed is:

1. A method for the formation of a coating of a titanium or zirconium nitride on the surface of a sintered silicon nitride ceramic article, characterized by the steps of depositing a coating of titanium or zirconium or a substance containing titanium or zirconium on the surface of said sintered ceramic article and sintering the resultant composite in a non-oxidative atmosphere to produce a reaction between the surface and the coating to form said coating of titanium or zirconium nitride.

2. A method according to claim 1, wherein said substance to be placed in contact with said sintered silicon nitride ceramic article contains titanium.

3. A method according to claim 2, wherein said substance containing titanium is titanium dioxide.

4. A method according to any of claims 1-3, wherein said non-oxidative atmosphere is formed of a mixed gas of nitrogen or argon and hydrogen.

* * * * *